United States Patent [19]

Schmoegner

[11] Patent Number: 4,753,188

[45] Date of Patent: Jun. 28, 1988

[54] HEAT HISTORY INDICATOR

[75] Inventor: John C. Schmoegner, Kearns, Utah

[73] Assignee: MDT Corporation, Torrance, Calif.

[21] Appl. No.: 381,168

[22] Filed: May 24, 1982

[51] Int. Cl.[4] .................. G01K 1/06; G01K 11/16; B32B 3/26

[52] U.S. Cl. .................. 116/217; 116/207; 374/162; 252/408.1

[58] Field of Search .............. 252/408.1, 962; 374/160, 161, 162; 436/2; 116/207, 216–219

[56] References Cited

U.S. PATENT DOCUMENTS

| | | | |
|---|---|---|---|
| 2,261,473 | 11/1941 | Jennings | 252/379 |
| 2,799,167 | 7/1957 | Loconti | 252/962 X |
| 2,892,798 | 6/1959 | Dobbs et al. | 252/408.1 |
| 2,916,344 | 12/1959 | Kukin et al. | 252/408.1 X |
| 2,928,791 | 3/1960 | Loconti | 252/408.1 |
| 3,980,581 | 9/1976 | Godsey, Jr. et al. | 252/408.1 |
| 4,121,011 | 10/1978 | Glover et al. | 252/962 X |
| 4,166,044 | 8/1979 | Germonprez et al. | 252/408.1 |
| 4,179,397 | 12/1979 | Rohowetz | 252/408.1 |
| 4,189,942 | 2/1980 | Giezen et al. | 73/356 |
| 4,217,373 | 8/1980 | Jennen et al. | 374/162 X |
| 4,232,552 | 11/1980 | Hof et al. | 252/408.1 X |
| 4,299,727 | 11/1981 | Hof et al. | 252/408.1 |
| 4,397,570 | 8/1983 | Hof et al. | 252/408.1 X |

Primary Examiner—Teddy S. Gron
Assistant Examiner—Catherine S. Kilby
Attorney, Agent, or Firm—Trask, Britt & Rossa

[57] ABSTRACT

A process monitoring heat history indicator in the form of a mixture of a first particulate component with a first characteristic color and a second particulate component with a second characteristic color. The first component includes a solvent system which melts at one or more defined temperatures so that when the mixture is heated to a selected temperature, it melts and wets the surface of the second component.

12 Claims, No Drawings

HEAT HISTORY INDICATOR

BACKGROUND OF THE INVENTION

1. Field

This invention relates to process indicators for use with articles which are periodically sterilized. It is specifically directed to a composition which may be printed on substrates and which changes from an initial color to a second color after exposure to a selected sterilizing temperature.

2. State of the Art

Process indicators for monitoring sterilizing procedures typically rely upon color changes to verify that the items which have been processed have in fact been subjected to a sterilizing temperature. Available process indicators of the type intended to verify heat history, have typically come in two types. Certain such indicators rely upon chemical changes. These indicators verify only that the indicator has been exposed to a particular temperature. They are not informative concerning the duration of exposure of the indicator to that temperature. In practice, sterilization requires exposure to a sterilizing temperature for a prescribed length of time. A second class of indicators relies upon a physical change of some type; e.g., melting wax or dissolution of one substance into another substance. Representative of patents which disclose process indicators of various types are U.S. Pat. Nos. 2,118,144 which teaches reliance upon a chemical change (sulfur and lead carbonate); 2,606,654 which suggests the use of heat unstable dyes ("fugitive dyes") 3,360,338; 3,386,807; and 3,684,737 which disclose indicators dependent upon chemical changes of various types; 3,946,612 which discloses a physical change corresponding to the action of a solvent; and 3,114,349 wherein a substance is disclosed which changes hue as one of its components melts.

There are a multitude of process indicators commonly used in the health care field. Many of these comprise chemical formulations containing ink. The formulation is applied to paper, cardboard or plastic substrates in the form of bags, tapes or other forms of packaging or indicator strips. A more complex type of indicator includes a colored substance blended with wax encased in an ampoule. As the wax melts, the ampoule displays a color change. Because of certain limitations in the indicators, notably the fact that the color change occurs without regard to other sterilization parameters, such as duration of exposure to a prescribed temperature, the indicators are relied upon primarily as an aid in preventing the reuse of items which may not have been put through the sterilizer at all. They are not truly a "fail safe" check on sterilization.

Among the problems associated with the heat history indicators of the prior art are the possibility of chemical contamination through the introduction of potentially harmful chemicals into the sterilizer chamber; limited shelf life, because of the tendency of many of the chemical compounds relied upon in the prior art to react upon exposure to light and/or heat substantially below sterilization temperature; difficulty of application of the indicator to the substrates desired for use in sterilizers, particularly in connection with printing the substrate with an indicator in ink form; and the display of a psychologically inappropriate color at the end of the sterilizing cycle. With respect to color change, most technicians experience some difficulty in recognizing such colors as brown or red as an indication that an article has been sterilized. There apparently exists no heat history indicator within the prior art which changes from a color readily recognized as a caution color (such as yellow, red or orange) to a color readily recognized as a safe or "proceed: color (such as green).

SUMMARY OF THE INVENTION

This invention avoids many of the inconveniences of prior art heat history indicators and provides an indicator adapted for ready application to substrates of nearly any type. Moreover, the heat history indicator of this invention may be formulated and packaged in a fashion which permits the monitoring of sterilization parameters in addition to temperature; that is, this invention makes it possible to monitor not only minimum temperature but the duration of exposure to that temperature. Moreover, the indicator of this invention may be formulated to display a recognized "caution" color initially and a recognized "proceed" color after exposure to sterilization conditions. In its preferred embodiments, the heat history indicator of this invention converts from an initial yellow color to a green color after sterilization. The novel compositions of this invention have virtually indefinite shelf life, and they are essentially inert, thereby introducing no contamination hazard to the sterilization chamber.

In general, the heat history indicator composition of this invention includes, in physical admixture, two particulate components. The first particulate component comprises a solvent with a selected melting point above ambient temperature, and dissolved therein, (or, in some cases intimately mixed therewith), a coloring agent. The coloring agent is typically an oil-soluble dye, present in sufficient quantity to impart a first characteristic color to a solution resulting from the dissolution of the dye in the solvent. In the preferred embodiments of this invention, the first characteristic color is green. The color of the first component should be sufficiently intense to mask the color of the second component after the admixture is heated, as explained more fully hereinafter. The second particulate component comprises pigment which is substantially insoluble in the solvent of the first particulate component and which has a second characteristic color. Preferably, this second characteristic color will be red or yellow, because of the psychological significance of these colors as "stop" or "caution" colors.

The first and second components are desirably each finely divided particulates. Usually, the second component will consist of one or more pigments, ground or otherwise provided in a small particle (e.g., −325 mesh) size. The first component may be produced by simply melting the solvent material and dissolving in sufficient dye to achieve the desired characteristic color. It is then cooled and solidified, and the resulting solidified solution is milled or otherwise comminuted to a particle size sufficiently fine for ready dispersement in admixture with the pigment component. Ideally, the particle size of the first or dye component is at least as fine as that of the pigment. When the components are intimately mixed, the characteristic color of the pigment component is dominant in the admixture.

The components in the admixture are proportioned so that the initial color of the admixture is similar to that of the second or pigment component. Although the second component, when viewed alone, may appear a brighter or more intense color, the admixture of the two components is nevertheless readily identifiable as having a color related to that of the pigment in the second component. When the admixture is exposed to heat higher in temperature than the melting temperature of the organic solvent, the individual particles of the first component melt and wet the surfaces of the individual particles of the second component, thereby masking their characteristic color. The admixture will ordinarily include a diluent of neutral color to facilitate this color change. For example, assuming that the characteristic color of the first component is green and the characteristic color of the second component is yellow, masking of the yellow pigment with green may not alone suffice to change the color displayed by the admixture from yellow to green. Therefore, it is usually desired to provide within the admixture particles of neutral color. For convenience of description, such particles are regarded as a portion of the second, or pigment, component. It is usually preferred to dilute the yellow color with sufficient volume of neutral (typically white) color to assure that when the yellow and white particles are coated with the green dye of the first component upon heating, the resulting admixture will predominate in green particles. Concurrently, the yellow pigment particle will be masked by a coating of green dye. As a consequence, the heated admixture will display a color which is different in quality than the characteristic color of component one, but which is nevertheless readily identifiable as green.

The pigments, solvents and dyes included within the admixture may be selected from those which are inert biologically and physiologically as well as chemically inert within the sterilization chamber.

The admixture of the first and second components may be encased in an ampoule or other suitable container for use as a heat history indicator. The shelf life of such ampoules is essentially infinite provided it is not exposed to temperatures approaching sterilization temperatures. More often, however, it is preferred to formulate the compositions of this invention as ink or coatings for paper, plastic or glass substrates. For such formulations, the admixture is suspended in a liquid vehicle compatible with printing processes. A notable feature of this invention is the ability of the physical admixture to be suspended in vehicles compatible with wet printing processes such as flexographic and gravure processes. That is, the aqueous colloidal dispersing resin, such as acrylic and maleic resin vehicles commonly used in flexographic and gravure printing processes may be used as the suspending vehicle for the admixtures of this invention to produce a heat sensitive ink which may be directly applied to paper or plastic strips suitable for application on packaging or test strips used in connection with sterilizing equipment. In practice, it has been found that the solids content of the suspension should be within the range of about twenty-five percent (25%) to about thirty-five percent (35%). Lower solids content gives marginal indication properties while higher solids contents are economically unjustified in view of the limited improvement achieved.

This invention contemplates specific formulations which provide significant information in addition to that normally determined by the heat history indicators of the prior art. The indicators of this invention may be formulated with mixtures of organic solvents having different individual discrete melting points (or narrow band of melting points) within a selected range of temperatures. In that event, it is possible to determine the approximate temperature within the selected range which was achieved during processing. The mechanism involved in this embodiment is that the characteristic color displayed by the heated composition will be predictably influenced by the amount of solvent which has in fact melted during processing. Those solvents with a sufficiently high melting point in excess of the temperature achieved will not melt, and therefore relatively less dye will be released to coat the pigment surfaces. Accordingly, a less intense color change will be selected. Ideally, green dye is separately dissolved in the separate solvents and the resulting solutions are milled. The milled solid solutions derived from separate solvent systems are physically mixed to produce a first composition as previously described in this disclosure. An admixture of this composition with a pigment composition of the type previously described can be suspended and applied in the same fashion as the other embodiments of this invention. A standard color chart may be prepared by exposing samples of this admixture similarly applied to various temperatures corresponding the melting points of the individual solvents in the dye composition. A comparison of the color of the indicator after exposure to sterilization conditions to the standard chart will establish both a minimum and a maximum temperature of exposure. Embodiments of this type may be referred to as "end point indicators".

An indicator which reflects the duration of exposure to a selected minimum temperature may be produced by applying to separate regions of a substrate composition of this invention varying in the amount of dye component present in the admixtures. It has been found that the color achieved depends upon the amount of dye present in the formulation and the length of time that the admixture is exposed to sterilizing temperature. Accordingly, comparing the color of a standardized indicator, (comprising a specified admixture applied in a specified suspension to a specified substrate), following sterilization procedures with a color chart prepared by exposing samples of that standard indicator to a specified temperature for specified periods of time serves as an indication of how long the sterilized articles associated with the indicator have been exposed to the specified sterilization temperature. Embodiments of this type may be referred to as "exposure time indicators".

It will be apparent that a great deal of useful information not previously obtainable from heat history indicators will be provided by the simultaneous use of the "end point" and "exposure time" indicators of this invention.

DESCRIPTION OF THE SPECIFIC EMBODIMENTS

A preferred admixture of this invention includes a green dye, a solvent for the dye, a yellow pigment and a white diluent. The first two constituents are for convenience considered to comprise a dye component. The latter two constituents are for convenience regarded as a pigment component.

Preferably, the dye component includes a nontoxic water insoluble solvent green dye such as triarylmethane (color index number 42,000) or one from the anthraquinone family, solvent green 3 (color index number 61,565). The dye is intimately blended with a nontoxic organic solvent for the dye, typically a fatty acid or wax having a melting point between about 150° F. and about 300° F. Examples of suitable nontoxic solvents are n- octadecanoic acid (mp 158° F.), carnauba wax (mp 185° F.), synthetic polymers (mp >250° F.). In some instances, the dye and solvent are simply milled together in an appropriate ration (usually 1 part dye from about 1 to about 5 parts by weight of the solvent). Alternatively and preferably, the solvent is melted and the dye dissolved therein prior to milling. In either case, the dye is eventually dissolved by the solvent either prior to or during exposure to sterilization temperatures. Accordingly, for purposes of this disclosure and the appended claims the coloring agent or dye is considered as being dissolved in the solvent even though it is recognized that such dissolution may not occur prior to application of the admixture to a substrate.

The pigment component of the admixtures of this invention are preferably characterized by a yellow color, resulting from the presence of a yellow pigment. An example of a suitable yellow pigment is iron oxide hydrate (Goethite) FeOOH or $Fe_2O_3.H_2O$. The pigment composition will normally include, in addition to the yellow pigment, a neutral or white pigment or filler agent. This material may be any inert material which lacks a dominating color. Calcium carbonate, mica and silica are examples of suitable fillers. Pigment grade calcium carbonate is presently preferred. The specific gravity of silica pigments tends to be inconveniently high for use with the preferred compositions of this invention, whereas certain other pigments, such as titanium dioxide are so white that they tend to dominate the blend. The proportion of yellow pigment and filler or white pigment should be proportioned to assure that the green dye color will ultimately dominate the heated admixture. For this reason, usually less than half of the pigment component will comprise yellow pigment. A presently preferred admixture of this invention will include, (on a surface area basis), at least one-fourth of the green dye composition, no more than one-fourth yellow pigment, and the remainder white or neutral pigment.

EXAMPLE I

A green composition is produced by dissolving one pound of triarylmethane dye into two pounds of n-octadecanoic acid. The solution is cooled to solidify it, and the solidified solution is milled to a 100 percent minus 325 mesh size. The resulting particulate green composition is mixed with pigment grade calcium carbonate (100 percent minus 325 mesh) and iron oxide pigment (100 percent minus 325 mesh) in the following ratios by weight: 10.7% green:14.9% white:6.4% yellow.

A printing ink vehicle system in common use for flexographic printing is supplied by Sinclair and Valentine of Salt Lake City, Utah. This vehicle is formulated from proprietary components in the proportions (part by weight) and proprietary identifies set forth in the following table:
  350 pbw: AM 8284
  25 pbw: 54-0201-25
  20 pbw: AM 5770
  5 pbw: 99-7250-99
  45 pbw: 54-9030-99

A suspension of thirty-two percent (32%) by weight solids of the green, white and yellow admixture is prepared from the admixture and solvent. This suspension is applied by flexographic printing to a paper substrate. The paper used is 25 to 35 pound white bleached Kraft. The dried suspension on the substrate displays a characteristic yellow color. When the paper indicator is heated in a sterilizing unit to above 160° F., the indicator's displayed color changes to a characteristic green color.

EXAMPLE II

One pound of solvent green 3 is dissolved into three pounds of carnauba wax. The solution is cooled, milled and mixed with pigment grade calcium carbonate and iron oxide pigments in the following ratio by weight: 15.0 green:15.0 white:5.0 yellow.

A forty percent by weight solids suspension is prepared by mixing this preparation with a printing ink vehicle system made up from 63.5 pbw Acrysol 1-100 (37%) Rohm & Haas, 1.2 pbm Defoamer—Drew L-418 and 11.8 pbw water. The viscosity of the resulting suspension is adjusted to 18"±3" as measured with a #3 Zahn cup. The suspension, when applied as described in Example I, displays a color change from yellow to green at about 185° F.

EXAMPLE III (End Point Indicator)

One pound of triarylmethane dye is dissolved into a blend of one pound of n-octadecanoic acid and two pounds of carnauba wax. The solution is cooled, milled and mixed with pigment grade calcium carbonate and iron oxide pigment in the following ratio by weight: 14.5 green:20 white:7 yellow.

A printing ink vehicle system is prepared by first preparing a UNI-RES 7098 Varnish mixture as follows:
40 pbw UNI-RES 7098
12 pbw Morpholine
48 pbw Water
The pH of the varnish mixture is adjusted to 8.3, and it is then blended with other components as follows:
30 pbw UNI-RES 7098 varnish mixture
0.1 pbw Defoamer (SAG 471)—Union Carbide
30 pbw Water
The viscosity of the resulting vehicle is adjusted to 18"±3" as measured with a #3 Zahn cup. The pH of the vehicle at 25° C. is 8.1. An ink suspension of 35% by weight solids of the pigment blend in the vehicle is prepared, and the suspension is applied to a paper substrate. The substrate is then exposed to various temperatures, displaying a yellowish color at temperatures below 160° F., a first green color at temperatures between about 160° F. and 185° F., and a second brighter green color at temperatures above about 185° F.

Reference herein to the specific details of certain preferred embodiments is not intended to limit the scope of the claims, which themselves recite those features regarded as essential to the invention.

I claim:
1. A heat history indicator composition, comprising:
  a physical admixture of a first particulate component and a second particulate component,
    said first particulate component comprising a solvent with a selected melting point above ambient temperature and a coloring agent soluble therein in an amount effective to impart a first characteristic color to said first component,
    said second particulate component comprising pigment which is substantially insoluble in said solvent and has a second characteristic color,
  said first and second components being present in amounts effective to display a color similar to said second characteristic color initially, but to display a color similar to said first characteristic color when said admixture is heated to above the melting point of said solvent, thereby to permit said first particulate component to melt and wet the surface of said second particulate component.

2. A composition according to claim 1 wherein said first particulate component comprises an oil soluble dye dissolved in an organic solvent.

3. A composition according to claim 2 wherein said organic solvent is a fatty acid or wax with a melting point higher than about 150° F.

4. A composition according to claim 2 wherein said dye is green in color and said first characteristic color is green, and wherein said second particulate component includes yellow pigment, and said second characteristic color is yellow.

5. A composition according to claim 4 wherein said second particulate component comprises a yellow pigment in admixture with a white pigment so that when said admixture is heated, the green dye of the first component coats individual yellow and white particles of said second component, said white pigment being present in an amount sufficient to ensure that the resulting blend of coated particles displays a color identifiable as green.

6. A composition according to claim 5 wherein:
said first particulate component is derived by melting organic solvent with melting point within the range of about 150° to about 300° F., dissolving sufficient green dye therein to impart a distinct green color to the resulting solution, cooling said solution to solidify it, and comminuting said solidified solution to a particular size no larger than that of the pigment in said second particulate component.

7. A composition according to claim 5 wherein said organic solvent comprises a blend of individual solvents of different melting points so that the green color resulting from heating said admixture differs in characteristics depending upon the highest temperature to which said admixture has been heated.

8. A composition according to claim 1 suspended in a liquid vehicle which is substantially non-solvent with respect to both said particulate components.

9. A suspension according to claim 8 wherein said liquid vehicle is selected for suitability in flexographic printing processes.

10. A suspension according to claim 9 wherein said admixture is present in said suspension in an amount in excess of about twenty-five percent (25%) by weight solids.

11. A composition according to claim 5 applied to separate regions of a substrate, the composition applied to each said region differing from that applied to each other said region in the amount of coloring agent present.

12. An indicator which reflects the duration of exposure to a selected minimum temperature comprising a first composition, as defined by claim 5, including a first selected amount of coloring agent, applied to a first region of a substrate; and a second composition, as defined by claim 5, including a second selected amount of coloring agent, applied to a second region of said substrate.

* * * * *